(12) United States Patent
St. Clair et al.

(10) Patent No.: US 6,822,656 B1
(45) Date of Patent: Nov. 23, 2004

(54) SPHERE MODE TEXTURE COORDINATE GENERATOR

(75) Inventors: Joe Christopher St. Clair, Round Rock, TX (US); Mark Ernest Van Nostrand, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 09/616,143

(22) Filed: Jul. 13, 2000

(51) Int. Cl.$^7$ .......................... G09G 5/00; G06T 15/00
(52) U.S. Cl. ...................... 345/582; 345/419
(58) Field of Search ................ 345/506, 419, 345/420, 582; 708/495, 507–8, 290

(56) References Cited

U.S. PATENT DOCUMENTS

| | | | | |
|---|---|---|---|---|
| 5,517,611 A | * | 5/1996 | Deering | 345/503 |
| 5,561,756 A | * | 10/1996 | Miller et al. | 345/848 |
| 5,870,509 A | * | 2/1999 | Alcorn | 382/293 |
| 5,930,519 A | * | 7/1999 | Krech, Jr. | 712/14 |
| 5,969,726 A | * | 10/1999 | Rentschler et al. | 345/506 |

* cited by examiner

Primary Examiner—Matthew C. Bella
Assistant Examiner—Anthony J Blackman
(74) Attorney, Agent, or Firm—Joseph P. Lally; Mark E. McBurney

(57) ABSTRACT

A sphere mode texture coordinate generator circuit for use in a graphics adapter of a data processing system is disclosed. The circuit includes a set of input multiplexers configured to receive x, y, and z components of a normal vector and a unit vector corresponding to the current vertex. The circuit further includes a set of functional units such as a floating point multiplier, a floating point adder, a floating point compare-to-zero unit, and an inverse square unit. The functional units are configured to receive outputs from the set of multiplexer and are enabled to perform floating point operations on the outputs of the set of multiplexers. A controller or state machine of the circuit is enabled to determine the state of select inputs to each of the set of multiplexers. The controller manages the multiplexer select inputs such that the circuit determines sphere mode texture coordinates in response to receiving the normal vector and the unit vector. The circuit typically includes a set of latches, where the input of each of the latches is connected to an output of a corresponding input multiplexer. The circuit may include an S Out multiplexer and a T Out multiplexer, where the output of S Out multiplexer represents the S sphere mode texture coordinate and the output of the T Out multiplexer represents the T sphere mode texture coordinate calculated in compliance with a predetermined specification such as the OpenGL® specification.

19 Claims, 7 Drawing Sheets

FIG. 6

| Curr Ss | Inputs | | Multiplier | | Adder | | Latches | | | Mux | Out | Next Ss |
|---|---|---|---|---|---|---|---|---|---|---|---|---|
| | start | rr=0 | SM_A | SM_B | SA_A | SA_B | SL1 | SL2 | SL3 | s/tOut | done | |
| 0 [a] | F(T) | - | $X_n$ | $X_c$ | $X_n$ | $X_n$ | L1 | L2 | - | L1/L2 | F | 0(1) |
| 1 | - | - | $Y_n$ | $Y_c$ | $Y_n$ | $Y_n$ | - | - | - | - | F | Curr+1 |
| 2 | - | - | - | - | $Z_n$ | $Z_n$ | - | - | - | - | F | Curr+1 |
| 3 | - | - | - | - | - | - | M | A | - | - | F | Curr+1 |
| 4 | - | - | $Z_n$ | $Z_c$ | L1 | M | A | L2 | - | - | F | Curr+1 |
| 5 | - | - | - | - | - | - | L1 | L2 | A | - | F | Curr+1 |
| 6 | - | - | - | - | - | - | L1 | L2 | L3 | - | F | Curr+1 |
| 7 | - | - | - | - | A | M | L1 | L2 | L3 | - | F | Curr+1 |
| 8 | - | - | - | - | - | - | L1 | L2 | L3 | - | F | Curr+1 |
| 9 | - | - | - | - | - | - | L1 | L2 | L3 | - | F | Curr+1 |
| 10 | - | - | A | L2 | - | - | L1 | A | L3 | - | F | Curr+1 |
| 11 | - | - | L1 | L2 | - | - | - | L2 | L3 | - | F | Curr+1 |
| 12 | - | - | L3 | L2 | $Z_c$ | 1.0 | - | - | - | - | F | Curr+1 |
| 13 | - | - | - | - | $X_c$ | -M | - | - | - | - | F | Curr+1 |
| 14 | - | - | - | - | $Y_c$ | -M | - | - | - | - | F | Curr+1 |
| 15 | - | - | - | - | A | -M | - | - | - | - | F | Curr+1 |
| 16 | - | - | A | A | - | - | A | - | - | - | F | Curr+1 |
| 17 | - | - | A | A | - | - | L1 | A | - | - | F | Curr+1 |
| 18 | - | - | A | A | - | - | L1 | L2 | - | - | F | Curr+1 |
| 19 | - | - | - | - | - | - | L1 | L2 | M | - | F | Curr+1 |
| 20 | - | - | 0.5 | L1 | L3 | M | - | L2 | - | - | F | Curr+1 |
| 21 | - | - | 0.5 | L2 | - | - | - | - | M | - | F | Curr+1 |
| 22 | - | - | - | - | - | - | - | - | L3 | - | F | Curr+1 |
| 23 | - | - | - | - | A | L3 | M | - | - | - | F | Curr+1 |
| 24 | - | - | - | - | - | - | L1 | M | - | - | F | Curr+1 |
| 25 | - | - | - | - | - | - | L1 | L2 | - | - | F | Curr+1 |
| 26 [b] | - | F(T) | - | - | - | - | L1 | L2 | - | - | F | 27(39) |
| 27 | - | - | - | - | - | - | L1 | L2 | - | - | F | Curr+1 |
| 28 | - | - | - | - | - | - | L1 | L2 | - | - | F | Curr+1 |
| 29 | - | - | - | - | - | - | L1 | L2 | - | - | F | Curr+1 |
| 30 | - | - | - | - | - | - | L1 | L2 | - | - | F | Curr+1 |
| 31 | - | - | R | L1 | - | - | - | L2 | R | - | F | Curr+1 |
| 32 | - | - | L3 | L2 | - | - | - | - | - | - | F | Curr+1 |
| 33 | - | - | - | - | - | - | - | - | - | - | F | Curr+1 |
| 34 | - | - | - | - | 0.5 | M | - | - | - | - | F | Curr+1 |
| 35 | - | - | - | - | 0.5 | M | - | - | - | - | F | Curr+1 |
| 36 | - | - | - | - | - | - | - | - | - | - | F | Curr+1 |
| 37 | - | - | - | - | - | - | A | - | - | - | F | Curr+1 |
| 38 | - | - | $X_n$ | $X_c$ | $X_n$ | $X_n$ | L1 | A | - | L1/A | T | 0 |
| 39 | - | - | - | - | - | - | 0.5 | 0.5 | - | 0.5/0.5 | T | 0 |

Notes:

Note a: Sstate remains in state 0 until sp_start is true them it advances to state 1.

Note b: Sstate jumps to 39 if rr=0 else it steps to 27.

US 6,822,656 B1

SPHERE MODE TEXTURE COORDINATE GENERATOR

BACKGROUND

1. Field of the Present Invention

The present invention generally relates to computer graphics and more particularly to a circuit that calculates sphere mode texture coordinates as part of a geometry processing device in a graphics adapter.

2. History of Related Art

Graphics display subsystems are almost universally encountered in microprocessor based computer systems to facilitate a variety of graphics tasks and applications including computer assisted drafting, architectural design, simulation trainers for aircraft and other vehicles, molecular modeling, virtual reality applications, and video games. Graphics processors, graphics adapters, and a variety of similarly designed computer products provide specialized hardware to speed the execution of graphics instructions and rendering of graphic images. These processors and adapters typically include, for example, circuitry optimized for translating, rotating, and scaling 3D graphic images. In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing volume, determining which of the graphic primitives are within the defined viewing volume, and rendering those graphic primitives as they would appear from the viewing point. This process can require a tremendous amount of computing power to keep pace with the ever increasingly complex graphics applications that are commercially available. Accordingly, designers of graphics systems and graphics applications are continuously seeking cost effective means for improving the efficiency at which graphic images are rendered and displayed.

Typically a software application program generates a 3D graphics scene, and provides the scene, along with lighting attributes, to an application programming interface (API) such as the OpenGL® API developed by Silicon Graphics, Inc. Complete documentation of OpenGL® is available in M. Woo et al., *OpenGL Programming Guide: The Official Guide to Learning OpenGL, Version* 1.2 (Addison Wesley Longman, Inc. 1999) and D. Schreiner, *OpenGL Reference Manual, Third Edition: The Official Reference Document to OpenGL, Version* 1.2 (Addison Wesley Longman, Inc. 1999), both of which are incorporated by reference herein.

A 3D graphics scene typically includes of a number of polygons that are delimited by sets of vertices. The vertices are combined to form larger primitives, such as triangles or other polygons. The triangles (or polygons) are combined to form surfaces, and the surfaces are combined to form objects. Each vertex is associated with a set of attributes. Vertex attributes may include a position, including three Cartesian coordinates x, y, and z, a material color, which describes the color of the object to which the vertex belongs, and a normal vector, which describes the direction to which the surface is facing at the vertex. Each light source has a number of properties associated with it, including a direction, an ambient color, a diffuse color, and a specular color.

Rendering is employed within the graphics system to create two-dimensional image projections of a 3D graphics scene for display on a monitor or other display device. Typically, rendering includes processing geometric primitives (e.g., points, lines, and polygons) by performing one or more of the following operations as needed: transformation, clipping, culling, lighting, fog calculation, and texture coordinate generation. Rendering further includes processing the primitives to determine component pixel values for the display device, a process often referred to specifically as rasterization.

The OpenGL® API specification and other API's such as the DirectX® API define the allowed vertex and scene attributes and the equations used to determine attribute values. In a Each vertex may also be associated with texture coordinates and/or an alpha (transparency) value. In addition, the scene itself may be associated with a set of attributes including, as examples, an ambient color that typically describes the amount of ambient light and one or more individual light sources, conventional graphics adapter, the calculations specified by a particular API are implemented in software. It will be appreciated that software calculations can adversely affect the performance of the graphics adapter, especially if the equations require complex, floating point calculations. It would therefore be desirable to implement, to the extent feasible, some or all of the calculations specified by a particular graphics API in dedicated hardware circuitry. Moreover, it would be desirable if the implemented solution balanced improved performance against cost by optimizing the hardware design to account for such factors as, the frequency with which the particular function or equation is invoked and the speed required of the particular equation.

OpenGL® specifies the manner in which environmental mapped texture coordinates (also referred to a sphere mode texture coordinates or, simply, sphere coordinates) are determined. It would desirable to implement the calculation of sphere mode coordinates in a dedicated hardware circuit that utilizes sufficient resources to perform the sphere mode coordinate calculations in significantly less time than required to perform the same calculation in software while not unnecessarily increasing the cost or size of the graphics adapter.

SUMMARY OF THE INVENTION

The problem identified above is addressed by a sphere mode texture coordinate generation circuit as disclosed herein for use in a graphics adapter of a data processing system. The circuit includes a set of input multiplexers configured to receive x, y, and z components of a normal vector and a unit vector corresponding to the current vertex. The circuit further includes a set of functional units such as a floating point multiplier, a floating point adder, a floating point compare-to-zero unit, and an inverse square unit. The functional units are configured to receive outputs from the set of multiplexer and are enabled to perform floating point operations on the outputs of the set of multiplexers. A controller or state machine of the circuit is enabled to determine the state of select inputs to each of the set of multiplexers. The controller manages the multiplexer select inputs such that the circuit determines sphere mode texture coordinates in response to receiving the normal vector and the unit vector. The circuit typically includes a set of latches, where the input of each of the latches is connected to an output of a corresponding input multiplexer. The circuit may include an S Out multiplexer and a T Out multiplexer, where the output of S Out multiplexer represents the S sphere mode texture coordinate and the output of the T Out multiplexer represents the T sphere mode texture coordinate calculated in compliance with a predetermined specification such as the OpenGL® specification.

BRIEF DESCRIPTION OF THE DRAWINGS

Other objects and advantages of the invention will become apparent upon reading the following detailed description and upon reference to the accompanying drawings in which:

FIG. 6 is a depiction of a scoreboard illustrating resource allocation of the sphere mode calculation circuit of FIG. 5.

Figure 1A:
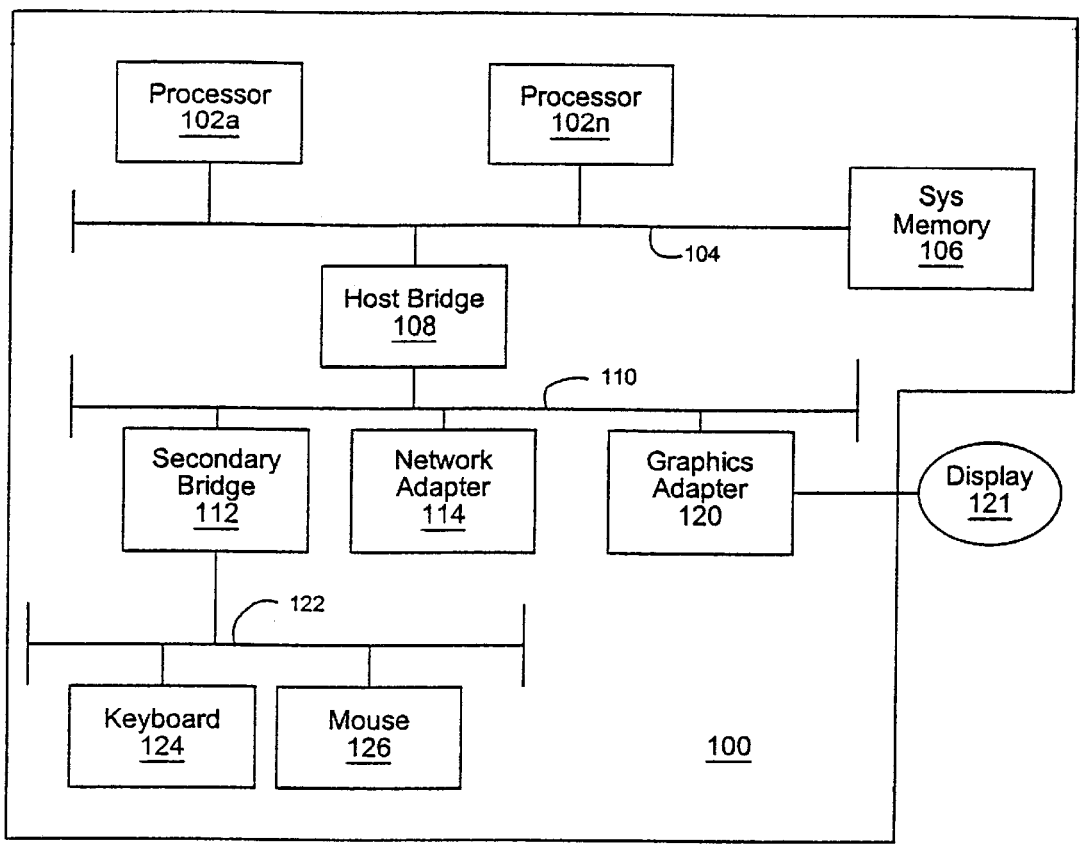
FIG. 1 is a block diagram of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of data processing system 100 according to one embodiment of the present invention. In the depicted embodiment, system 100 includes one or more processor(s) 102a through 102n (generically or collectively referred to herein as processor(s) 102) are connected to a system bus 104. Processors 102 may be implemented with any of a variety of microprocessor components including, as examples, PowerPC® processors from IBM Corporation, SPARC® processors from Sun Microsystems, and x86 compatible architectures such as the Pentium® family of processors from Intel Corporation and the Athlon® family of processors from Advanced Micro Devices, Inc.

A system memory (RAM) 106 is accessible to processors 102 via system bus 104. A host bridge 108 is connected between system bus 104 and an IO bus 110. IO bus 110 is typically implemented as a PCI bus (as specified in *PCI Local Bus Specification Rev.* 2.2 available from the PCI Special Interest Group at www.pcisig.com and incorporated by reference herein), or a PCI derivative such as the Advanced Graphics Protocol (AGP) bus defined by Intel Corporation. The depicted embodiment of system 100 includes various peripheral devices including a network adapter 114 suitable for connecting system 100 to computer network and a secondary bridge 120 that provides support for legacy 10 devices such as a keyboard 124 and a mouse 126. System 100 further includes a graphics adapter 120 connected to IO bus 110. The graphics adapter 120 is enabled to process graphics data received via IO bus 110 and typically includes a video controller that controls the image displayed on a display device 121.

Figure 1B:
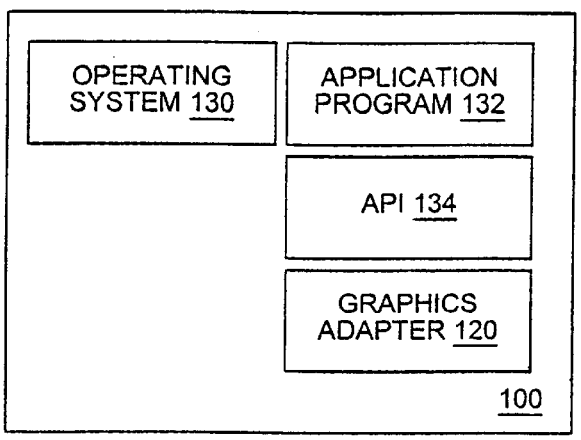

Referring now to FIG. 1B, a conceptual illustration of the system software relevant to the present disclosure is depicted. During system operation, system memory 106 may include all or portions of an operating system 130. Suitable operating systems include the AIX® operating system from IBM Corporation (or another Unix derivative operating system), a Windows® family operating system from Microsoft, or a network operating system such as JavaOS® from Sun Microsystems. An application program 132 generates graphics scenes that are passed to an API 134. In an embodiment particularly relevant to the present disclosure, API 134 may be the OpenGL® API, the DirectX® API, or another suitable 3D programming interface. API 134 processes graphics scenes generated by application program 132 and, via graphics adapter 120, maintains the contents of a video display screen, plotter, or other suitable output device.

Figure 2:
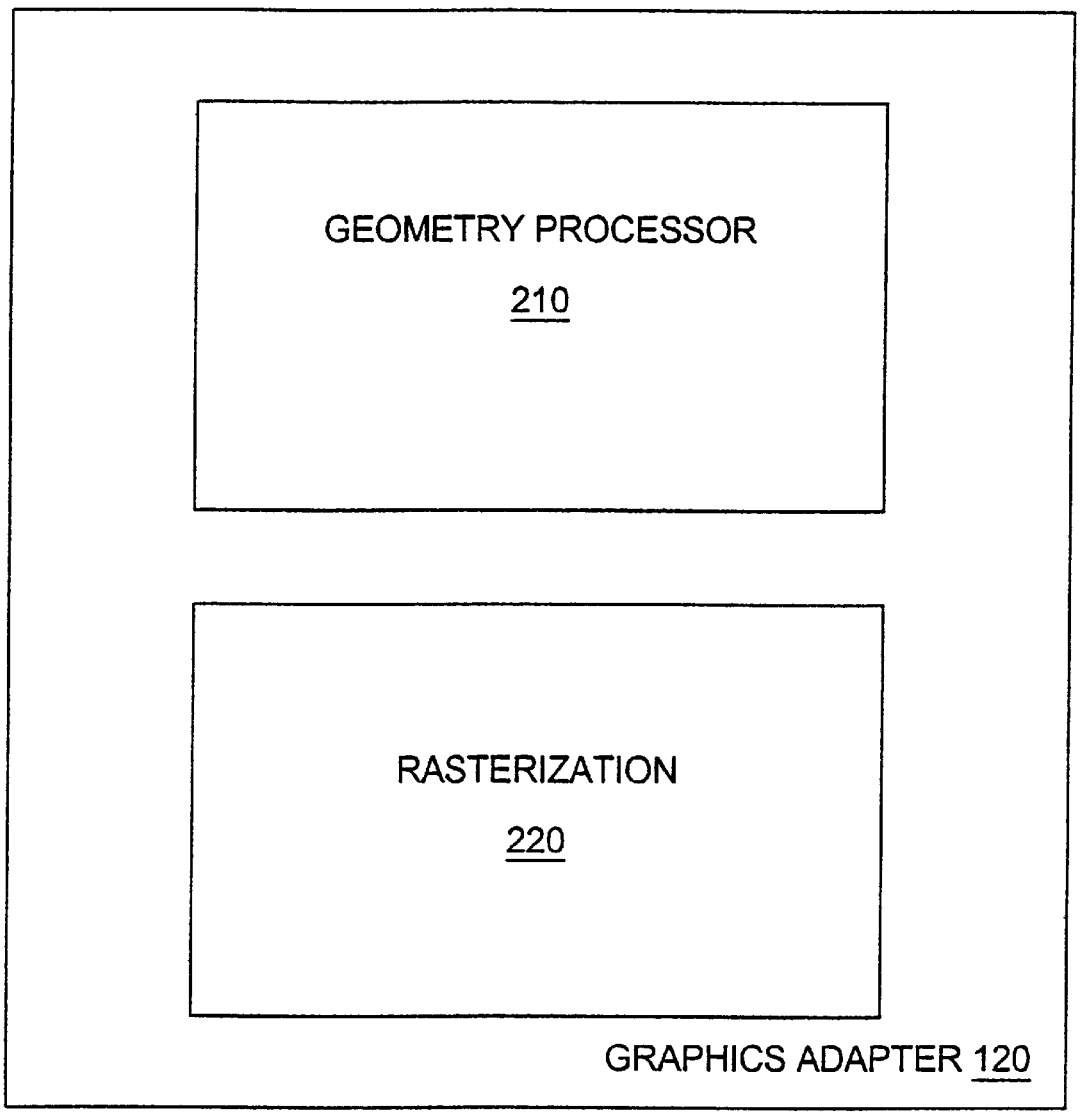
FIG. 2 is a block diagram of an embodiment of the graphics adapter of FIG. 1.

As depicted in FIG. 2, graphics adapter 120 includes a geometry processor 210 and a rasterization portion (rasterizer) 220. The geometry processor 210 performs complex calculations in response to data received from API 134 to generate the attributes specified by API 134. Rasterizer 220 determines pixel values for the display device based upon information received from geometry processor 210 and maintains the contents of a frame buffer or other suitable graphics storage facility that is used to stored a representation of the image that is displayed by the display device.

Figure 3:
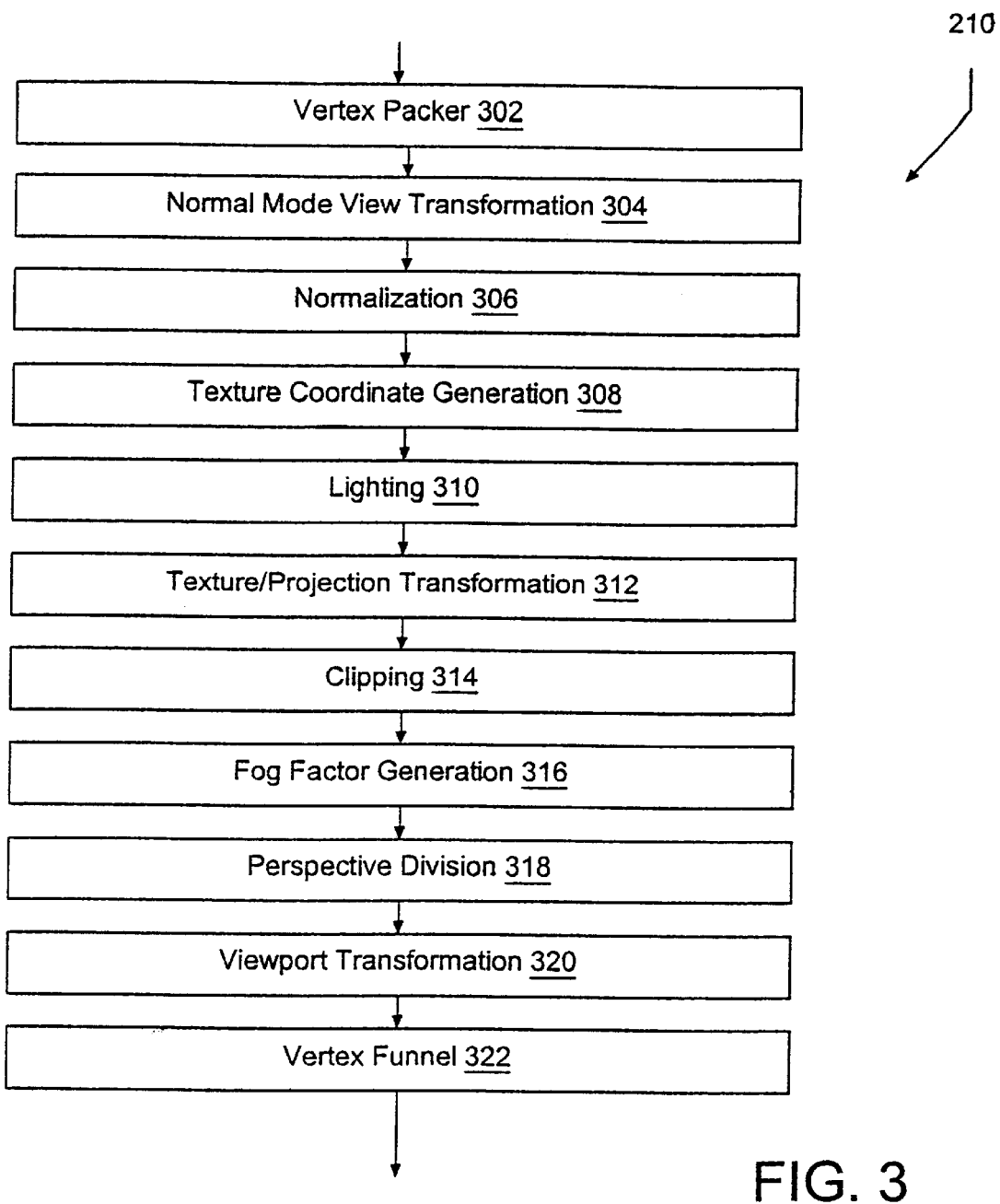
FIG. 3 is a block diagram of an embodiment of a geometry pipeline of the graphics adapter of FIG. 2.

Referring now to FIG. 3, a simplified block diagram of one embodiment of a geometry processor (also referred to as geometry pipeline) 210 is presented. In the depicted embodiment, geometry pipeline 210 receives data generated by API 134. In one embodiment, geometry processor 210 includes an interface that receives data, including commands and object coordinates, from IO bus 110 in 32-bit chunks. A vertex packer 302 converts the 32-bit chunks into a vertex width internally supported by geometry pipeline 210. At various stages in pipeline 210, the vertex width may vary depending upon the data that is required by the stage. In addition, vertex packer 302 provides default values (pursuant to the API 134) for vertex attributes that are not specified by the application program.

Vertex packer 302 forwards object coordinates to normal/model view transformation stage 304 where the normal vector is transformed from object space into eye space and the object coordinates are transformed into eye coordinates by translating, scaling, and rotating objects. The normalization stage 306 changes a normal vector to a vector of unit length (i.e., a vector having a magnitude of 1.0), while preserving the direction of the original vector. In addition, normalization stage 306 may generate normalized eye coordinates. The texture coordinate generation block 308, as its name implies, is responsible for generating object linear, eye linear, or spherical texture coordinates.

The lighting stage 310 generates the color of each vertex of an object based on the orientation of the object and its material properties as well as the properties of the scene and any light sources that are defined. Texture/projection transformation stage 312 transforms texture coordinates by translating, scaling, and rotating objects and moves objects into a viewing volume by transforming eye coordinates into clip coordinates by translating, rotating, and scaling objects. Perspective projection makes objects that are further away from the viewer appear smaller whereas orthogonal projection does not.

Clipping stage 314 clips objects to a defined viewing volume while fog factor generation stage 316 makes objects fade into the distance by making objects further from the viewer less visible than objects closer to the viewer. The perspective division stage 318 transforms clip coordinates to normalized device coordinates [−1,+1] by dividing by the 4th coordinate (the W coordinate). The view transformation stage 320 facilitates the rasterization process by transforming normalized device coordinates into screen or window coordinates. Finally, the vertex funnel 322 converts the internal vertex format into a 32-bit format suitable for an output interface of geometry processor 210. In addition, vertex funnel 322 may convert one or more floating point values to fixed point values.

Figure 4:
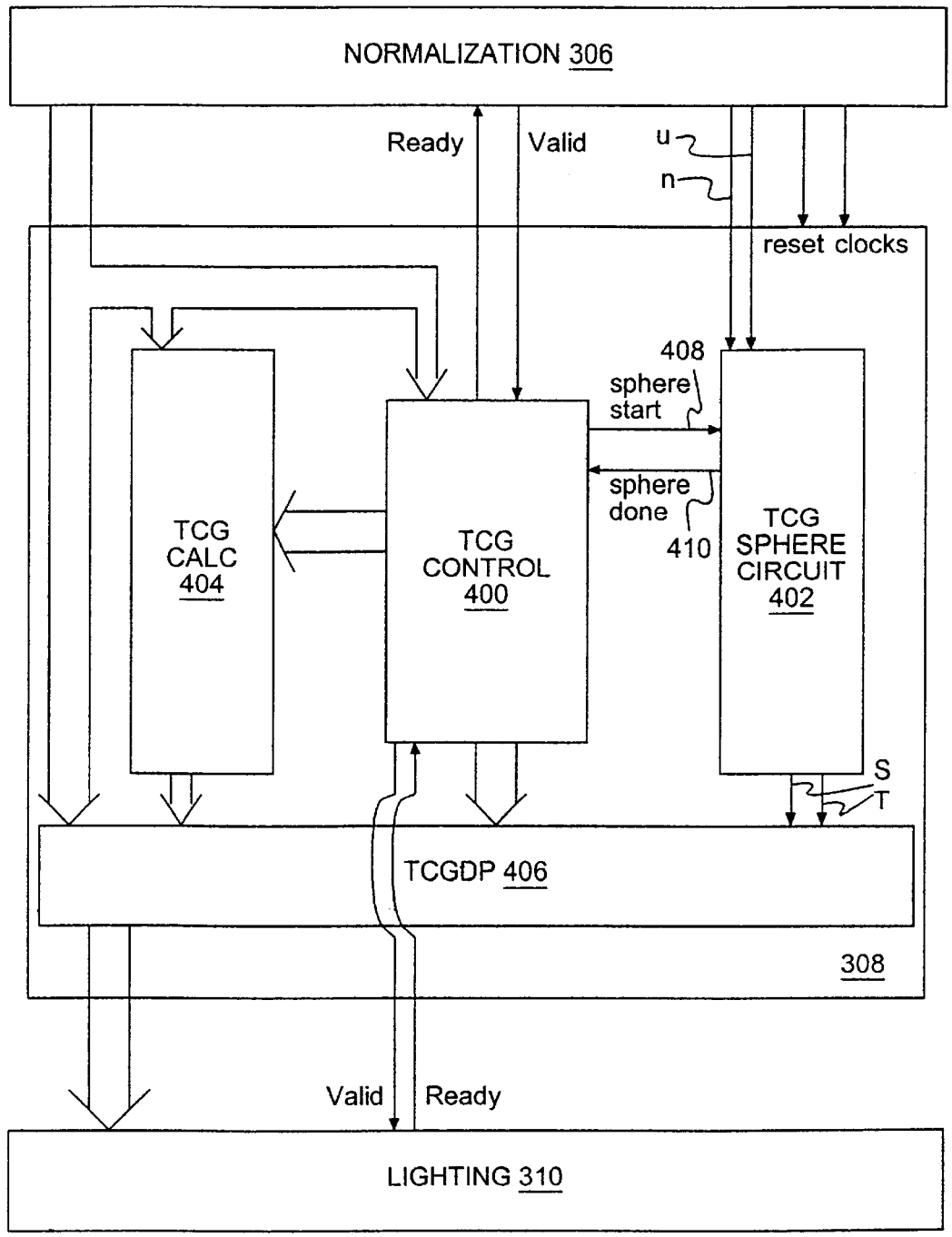
FIG. 4 is a block diagram illustrating functional blocks of a texture coordinate generation stage of the geometry pipeline of FIG. 3.
Figure 5:
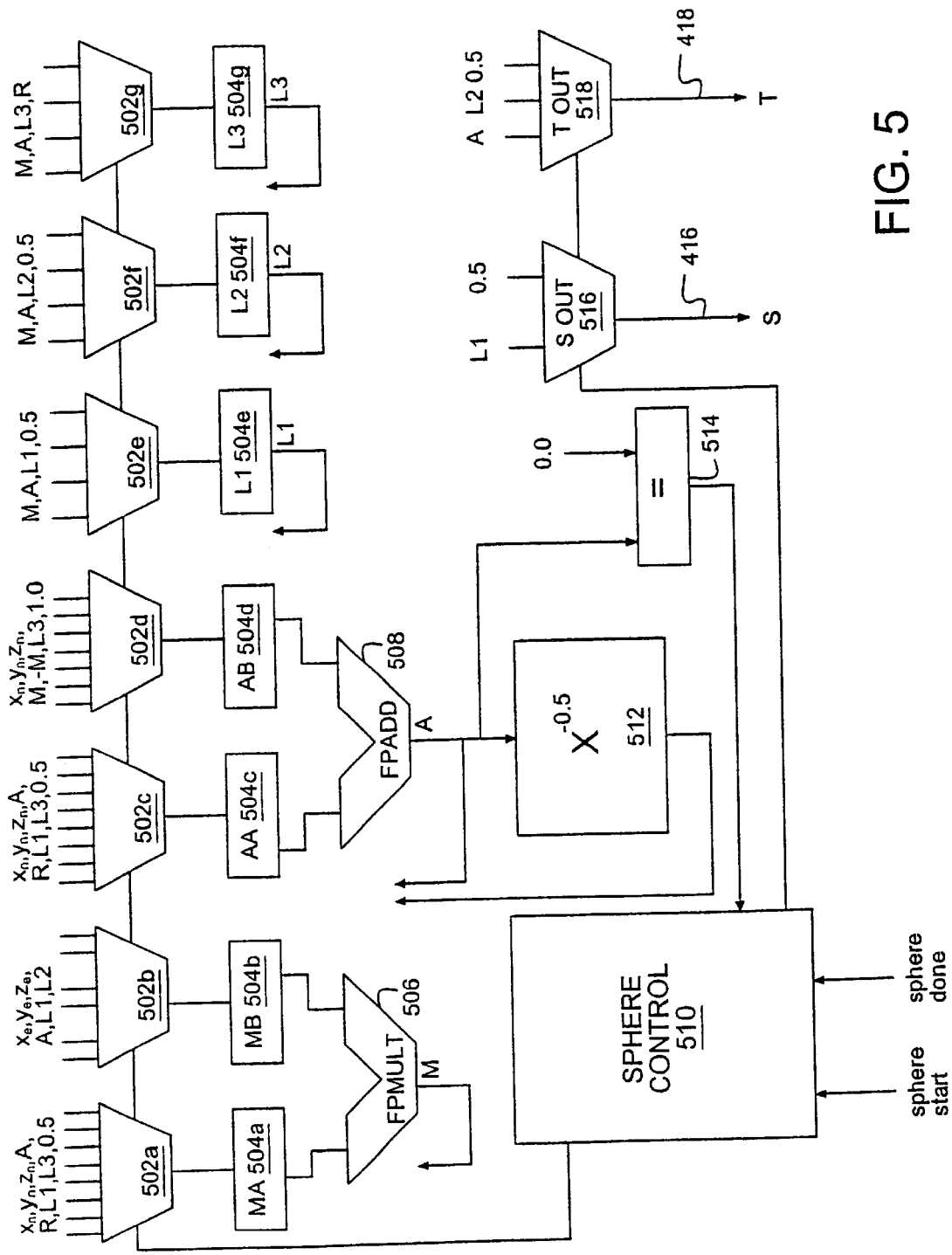
FIG. 5 is diagram of a sphere mode calculation circuit of the texture coordinate generation stage of FIG. 4.

Turning now to FIGS. 4 and 5, additional detail of texture coordinate generation (TCG) stage 308 according to one embodiment of the present invention is presented. The depicted embodiment of TCG stage 308 includes a TCG Control Unit 400, a TCG Calculation unit 404, a TCG Data Path 406, and TCG sphere coordinate generation circuit (TCG sphere circuit) 402. TCG Control unit 400 exchanges ready/valid signals with a previous stage in the geometry pipeline (normalization stage 306) and a subsequent stage in the pipeline (lighting state 310) to control the flow of data through the pipeline. In addition, TCG Control Unit 400 determines the texture mode (such as object linear, eye linear, or spherical) and invokes TCG calculation circuit 404 and TCG sphere circuit 402 as needed for the determined texture mode. TCG calculation unit 404 is configured to generate texture coordinates in linear texture modes while TCG sphere circuit 402 is enabled to generate sphere mode texture coordinates in response to receiving a unit vector, a normal vector, and an appropriate initiation signal from TCG Control Unit 400. The TCG Data Path 406 buffers information from TCG calculation unit 404, TCG control Unit 400, and TCG sphere circuit 402 for retrieval by the subsequent geometry pipeline stages. In addition, TCG Data Path 406 performs multiplexing to select data from TCG sphere circuit 402 or TCG calculation 404 for forwarding to subsequent stages of the pipeline depending upon the texture coordinate mode. In an eye or linear mode, TCG Data Path 406 may select data from TCG calculation circuit 404 for forwarding while, in a spherical texture coordinate mode, TCG Data Path 406 may select data from TCG Sphere Circuit 402.

In the depicted embodiment, the TCG sphere circuit 402 includes a set of input multiplexers 502a (the MA multiplexer), 502b (MB multiplexer), 502c (AA multiplexer), 502d (AB multiplexer), 502e (L1 multiplexer), 502f (L2 multiplexer), and 502g (L3 multiplexer) (all generically or collectively referred to herein as multiplexer (s) 502), a set of latches 504a (the MA latch), 504b (MB latch), 504c (AA latch), 504d (AB latch), 504e (L1 latch), 504f (L2 latch), and 504g (L3 latch) (generically or collectively referred to herein as latch(es) 504) where each latch 504 is connected to the output of a corresponding input multiplexer 502. TCG sphere circuit 402 as depicted in FIG. 5 further includes a set of functional units including a floating point multiplier 506, a floating point adder 508, an inverse square root unit 512, and a floating point compare-to-zero unit 514. In addition, TCG sphere circuit 402 includes, an S output 25 multiplexer 516, a T output multiplexer 518, and a controller 510 that maintains the state of the multiplexer select input signals in each cycle.

In the depicted embodiment, the outputs of latches 504a and 504b are connected to the inputs of floating point multiplier 506 while the outputs of latches 504c and 504d are connected to the inputs of floating point adder 508. The latches 504e, 504f, and 504g are used to hold intermediate results in the calculation of the sphere mode texture coordinates. Thus these outputs are shown in FIG. 5 as being fed back to the inputs of the set of multiplexers 502.

The controller receives a sphere start signal 408 from the TCG control unit 400 (FIG. 4) that initiates the calculation of the sphere mode texture coordinates. Upon receiving a VALID signal from the prior stage of geometry pipeline 210 (i.e., the normalization stage 306) and sending a READY signal to normalization stage 306, TCG stage 308 receives a unit vector (u) and a normal vector (n) and the TCG Control unit 400 determines whether the sphere mode is active. If the sphere mode is active, TCG control unit asserts the sphere start signal 408 that informs controller 510 of TCG Sphere circuit 402 that sphere mode texture coordinates are to be generated.

In one embodiment, the sphere mode texture coordinates are generated in compliance with the OpenGL® specification. OpenGL® specifies that the sphere mode texture coordinates are calculated from the unit vector $u=(x_e, y_e, z_e)$ pointing from the origin to the current vertex expressed in eye coordinates and the current vertex normal vector $n=(x_n, y_n, z_n)$.

Let:

$n \cdot u = x_e x_n + y_e y_n + z_e z_n$ $r_x = x_e - 2 x_n n \cdot u$ $r_y = y_e - 2 y_n n \cdot u$ $r_z = z_e - 2 z_n n \cdot u$ and $m = 2[(r_x^2 + r_y^2 + (r_z+1)^2]^{0.5}$ OpenGL® defines the sphere mode texture coordinates S and T as:

$S = T = 0.5$ if $m = 0$ $S = r_x/m + 0.5$ if $m \neq 0$ and $T = r_y/m + 0.5$ if $m \neq 0$.

TCG control unit 400 asserts sphere start signal 408 only after TCG sphere circuit 402 has received a valid u vector and a valid n vector. Upon detecting the assertion of sphere start signal 408, controller 510 begins controlling the selector signals to the various input multiplexers 502. The inputs that are available to each of the input multiplexers 502 are indicated in FIG. 5, where "A" indicates the output of floating point adder 508, "M" indicates the output of floating point multiplier 506, "R" indicates the output of inverse square root unit 512, "L1," "L2," and "L3" indicate the outputs of latches 504e, 504f, and 504g respectively, "1.0" indicates a floating point constant of 1.0, and "0.5" indicates a floating point constant of 0.5. Thus, in the depicted embodiment, multiplexer 502a may select from 8 floating point inputs, three of which comprise the x, y, and z components of the normal vector n. In addition, multiplexer 502a may select from the A, R, L1, L3 and 0.5 signals. Multiplexer 502b, may select from 6 inputs, three of which are the x, y, and z components of the unit vector u and the remaining three of which are the A, L1, and L2 signals. The available inputs for the remaining multiplexers 502c, 502d, 502e, 502f, and 502g are as depicted in FIG. 5. Once initiated, the controller 510 cycles through a defined set of steps in the process of calculating the S and T values by appropriately controlling the select inputs to the set of input multiplexers 502a through 502g, the S out multiplexer 516, and the T out multiplexer 518 during each cycle of the process. At the end of the process the S and T values are valid on S signal 416 and T signal 418 respectively.

The output of the floating point compare-to-zero circuit 514 is routed to the controller 510 to account for the case in which the m value, as defined above, is zero. Upon determining that the m value is zero, the sphere controller selects the 0.5 inputs for the S out multiplexer 516 and the T out multiplexer 518 in compliance with the OpenGL® specification.

Figure 7:
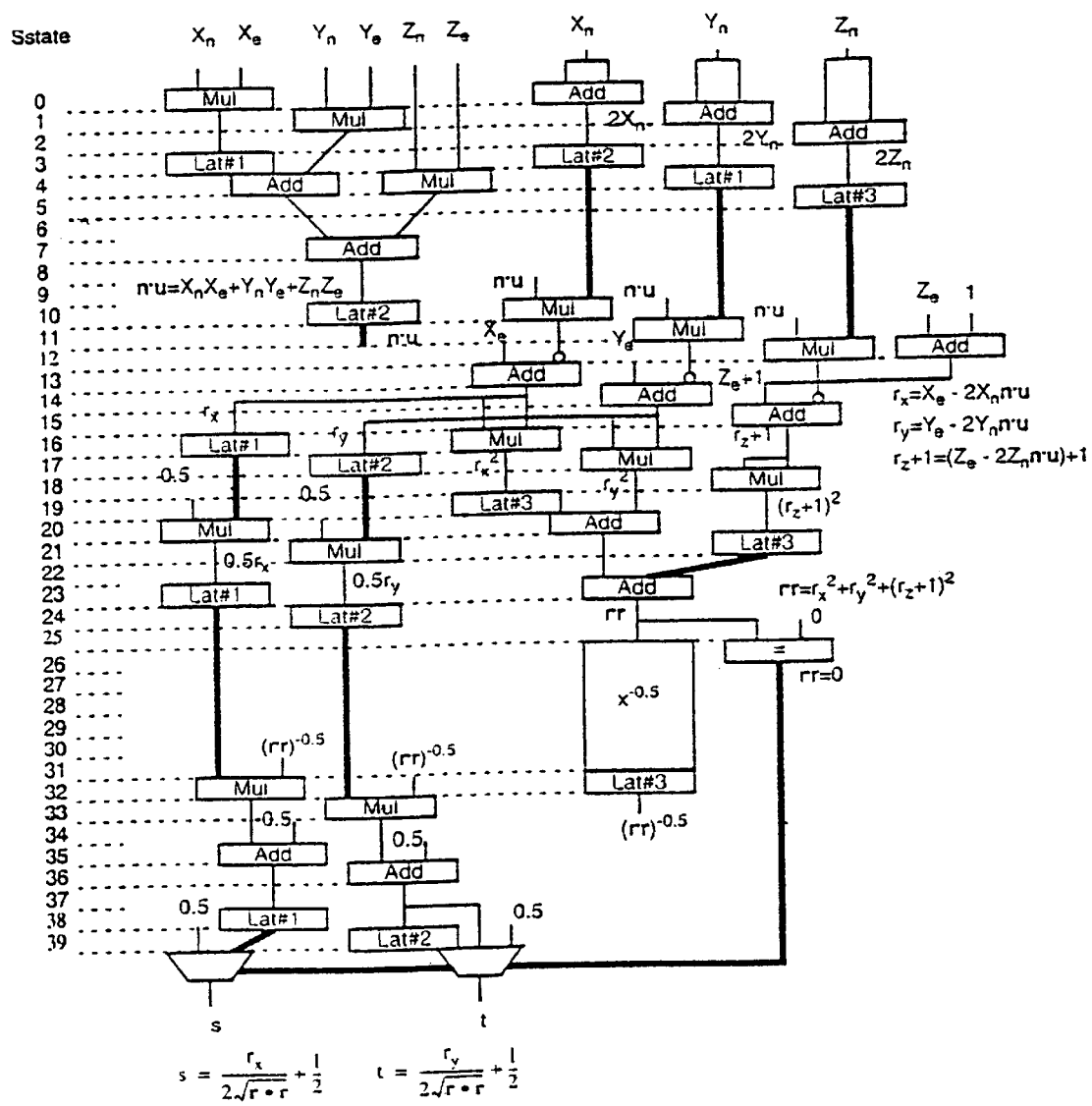
FIG. 7 illustrates the operation of the sphere mode calculation circuit of FIG. 5.

Turning now to FIGS. 6 and 7, a scoreboard 600 and a conceptualized state transition diagram 700 are presented to illustrate the operation of controller 510 and TCG Sphere circuit 402 according to one embodiment of the invention. Each row in scoreboard 600 represents a clock cycle. Scoreboard 600 identifies the inputs that controller 510 selects during the corresponding clock cycle and indicates (in the column labeled "Next Ss") the next cycle that controller 510 will execute. Initially, controller 510 idles in cycle 0 (the cycle numbers are as indicated in the column identified as ("Curr Ss") until the sphere start input is asserted (as indicated by the "T" in the column labeled ("start"), at which point controller 510 increments to cycle 1 (as indicated in the Next Ss column).

In cycle 0, controller 510 selects the $x_n$ input of MA multiplexer 502a, the $x_e$ input of MB multiplexer 502b, the $x_n$ input of AA multiplexer 502c, the $x_n$ input of AB multiplexer 502d, the L1 input of L1 multiplexer 502e, and the L2 input of L2 multiplexer 502f (the select input of L3 multiplexer 502g is a "don't care" in cycle 0). Referring to state transition diagram 700, it is seen that the select inputs identified in cycle 0 of scoreboard 600 route the $x^n$ and $x_e$ inputs to the A and B inputs of floating point multiplier 506 and the $x_n$ and $x_n$ inputs to the A and B inputs of floating point adder 508 (after appropriate clocking through the corresponding latches 504). In the embodiment depicted in FIGS. 6 and 7, it is assumed that floating point multiplier 506 and floating point adder 508 each require 2 cycles to complete the corresponding floating point operation. Thus, the output of floating point multiplier 506 will indicate the floating point product of $x_n$ and $x_e$ two cycles after the input values are presented to multiplier 506 (i.e., in cycle 3) and the output of floating point adder 508 will indicate the floating point sum of $x_n$ and $x_n$ (i.e., $2x_n$). In cycle 3, controller 510 selects the M input of L1 multiplexer 502e and the A input of L2 multiplexer 502f thereby latching the floating point product $x_n*x_e$ into L1 latch 504e and the floating point sum $2x_n$ into L2 latch 504f, where they can be used for subsequent operations. In a similar manner for each of the cycles in the sphere mode texture coordinate generation process, FIGS. 6 and 7 indicate the state of each of the latches 504 and each of the multiplexers 502, 516, and 518.

From a functional perspective, TCG sphere circuit 402 begins the process of calculating S and T values by first calculating the dot product of the n and u vectors using floating point multiplier 506, floating point adder 508, and appropriate values for the select inputs to multiplexers 502a, 502b, 502c, 502d, and 502e in cycles 0 through 7 thereby producing the dot product in cycle 9 and latching it into L2 latch 504f in cycle 10. Simultaneously, in cycles 0 through 5, circuit 402 calculates the values $2x_n$, $2y_n$, and $2z_n$ using adder 508 and stores the values in latches 504e, 504f, and 504g respectively for subsequent use in calculating $r_x$, $r_y$, and $r_z+1$ (as defined above) in cycles 13, 14, and 15 respectively. It should be noted that, because the depicted implementation of circuit 402 includes just a single floating point multiplier 506 and a single floating point adder 508, there can be, at most, just one occurrence of the multiplier and the adder in each cycle of FIG. 7.

The values $r_x$ and $r_y$ are stored in L1 latch 504e and L2 latch 504f respectively in cycles 16 and 17 for subsequent use in calculating S and T values. Simultaneously, the $r_x$, $r_y$, and $r_z+1$ quantities are squared (multiplied by themselves) using floating point multiplier 506 in cycles 16, 17, and 18 to produce the quantities $r_x^2$, $r_y^2$, and $(r_z+1)^2$, which are needed to determine the value m. These three quantities are summed (two at a time) using adder 508 in cycles 20 and 23 to produce the value $rr=r_x^2+r_y^2+(r_z+1)^2$, which is valid at the output of adder 508 in cycle 25. The rr value is directed to the input of the inverse square root unit 512 and to the input of the floating point compare-to-zero unit 514 as a proxy for determining if the quantity m=0. (It will be appreciated that the m=0 if and only if rr=0). Recall that, if m=0, then S and T are both defined to be 0.5. Thus, the output of the floating point compare-to-zero unit 514 determines the state of the select inputs for S out multiplexer 516 and T out multiplexer 518.

The $r_x$ and $r_y$ values produced in cycles 18 and 14 respectively are latched into L1 latch 504e and L2 latch 504f in cycles 16 and 17 and multiplied by 0.5 using multiplier 506 in cycles 20 and 21 to generated the values $0.5r_x$ and $0.5r_y$, which are latched in L1 latch 504e and L2 latch 504f in cycles 23 and 24. The inverse square root unit 512 calculates the quantity $(rr)^{-0.5}$ from rr, which is valid at the input of inverse square root unit 512 in cycle 26. In the depicted embodiment, the inverse square root unit requires five cycles (cycles 26–30) to generate the output value $(rr)^{-0.5}$, which is latched into L3 latch 504g in cycle 32. The value $(rr)^{-0.5}$ is then multiplied by the values $0.5r_x$ and $0.5r_y$ using multiplier 506 in cycles 32 and 33 and added to 0.5 using adder 508 in cycles 35 and 36 to produce the values $0.5r_x/(rr)^{0.5}+0.5$ and $0.5r_y/(rr)^{0.5}+0.5$, which are latched into L1 latch 504e and L2 latch 504f in cycles 38 and 39 respectively.

If the quantity rr equals 0 (as determined by compare-to-zero unit 514), the 0.5 inputs to S Out multiplexer 516 and T Out multiplexer 518 are selected as the S and T values that are output from TCG Sphere circuit 402. If, rr is not equal to 0, the L1 and L2 inputs to multiplexers 516 and 518 are selected as the S and T values. Referring back to FIG. 6, it is seen in cycles 38 and 39 that, upon generating the S and T values, controller 510 asserts the sphere done signal 410 that informs TCG Control unit 400 that the calculation is complete. Thus, TCG Sphere circuit 402 calculates a pair of floating point values representing the S and T values as specified in the OpenGL® specification in less than 40 machine cycles. It will be appreciated that, while the S and T values may be computed in software, the number of cycles required to do so would be significantly greater than 40. In addition, the hardware implementation described herein is a concise design that achieves a significant performance benefit with a compact circuit that uses just a single floating point adder, a single floating point multiplier, an inverse square unit, a floating point compare to zero unit, a state machine (controller 510) and conventional multiplexer and latch logic. While additional resources (such as an additional floating point adder or multiplier) may be added to other embodiments of TCG sphere circuit 402, the incremental increase in performance achieved by doing so is not cost justified (in terms of the increase in area required to implement TCG Sphere circuit 402) in most graphic applications. In other words, the disclosed implementation of TCG Sphere circuit 402 embodies an optimized tradeoff between performance and cost.

It will be apparent to those skilled in the art having the benefit of this disclosure that the present invention contemplates a dedicated hardware solution for determining sphere mode texture coordinates in the geometry pipeline of a graphics adapter. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A circuit for use in a graphics adapter, comprising:
a set of input multiplexers configured to receive x, y, and z components ($x_n$, $y_n$, and $z_n$) of a normal vector (n) and x, y, and z components ($x_e$, $y_e$, and $z_e$) of a unit vector (u), wherein the normal vector and unit vector correspond to a current vertex;
a set of functional units configured to receive outputs from the set of multiplexers and enabled to perform floating point operations on the received outputs; and
a controller enabled to control select inputs to each of the set of input multiplexers to calculate S and T components of sphere mode texture coordinates from the normal vector and the unit vector, wherein the S component is equal to $0.5+0.5(x_e-2x_n*u)/(rr)^{0.5}$, the T component is equal to $0.5+0.5(x_e-2x_n*u)/(rr)^{0.5}$, rr is equal to $r_x^2+r_y^2+(r_z+1)^2$, $r_x$ is equal to $x_e-2x_e(n*u)$, $r_y$ is equal to $y_e 2y_n(n*u)$, and $r_z+1$ is equal to $1+z_e-2z_n(n*u)$.

2. The circuit of claim 1, further comprising a texture coordinate generation control unit configured to select the circuit to calculate the S and T components when a texture coordinate mode of the adapter is sphere mode.

3. The circuit of claim 1, wherein the set of functional units comprises a floating point adder, a floating point multiplier, an inverse square root unit, and a floating point compare-to-zero unit.

4. The circuit of claim 3, further comprising a first output multiplexer and a second output multiplexer, wherein the output of the first output multiplexer represents the S sphere mode texture coordinate and the output of the second output multiplexer represents the T sphere mode texture coordinate.

5. The circuit of claim 4, wherein the first and second output multiplexers each include an input that receives a floating point constant value of 0.5.

6. The circuit of claim 5, wherein the 0.5 outputs of the first and second output multiplexers are selected based on the output of the floating point compare-to-zero unit.

7. A sphere mode texture coordinate generator circuit, comprising:
a set of input multiplexers configured to receive $x_n$, $y_n$, and $z_n$ components of a normal vector (n) and $x_e$, $y_e$, and $z_e$ components of a unit vector (u), wherein the normal vector and unit vector correspond to a current vertex;
a floating point multiplier configured to receive outputs from a first of the input multiplexers and second of the input multiplexers;
a floating point adder configured to receive outputs from a third of the input mulitplexers and a fourth of the input mulitplexers;
an inverse square root unit enabled to generate the inverse square root of a floating point input;
a set of latches, each enabled to store outputs from a corresponding input multiplexer in the set of input multiplexers; and
a control unit configured to control the select inputs for the set of multiplexers such that the sphere mode texture coordinate generator circuit performs a sequence of calculations to determine S and T components of sphere mode texture coordinates wherein the S component is equal to $0.5+0.5(x_e-2x_n n*u)/(rr)^{0.5}$, the T component is equal to $0.5+0.5(x_e-2x_n n*u)/(rr)^{0.5}$, rr is equal to $r_x^2+r_y^2+(r_z+1)^2$, $r_x$ is equal to $x_e-2x_n(n*u)$, $r_y$ is equal to $y_e-2y_n(n*u)$, and $r_z+1$ is equal to $1+z_e-2z_n(n*u)$.

8. The circuit of claim 7, wherein the sequence of calculations includes calculating a dot product (n*u) of the normal vector and unit vector, calculating $r_x$, $r_y$ and $r_z+1$ values from the dot product and the components of the normal and unit vectors, calculating an rr value from the $r_x$, $r_y$, and $r_z+1$ values, calculating an inverse square root of the rr value, calculating an S component of the sphere mode texture coordinates from the inverse square root value and the $r_x$ value, and calculating a T component of the sphere mode texture coordinates from the inverse square root value and the $r_y$ value.

9. The circuit of claim 8, further comprising a floating point compare-to-zero unit configured to receive the rr value, wherein the circuit is configured to generate S and T values of 0.5 if the rr value is equal to zero.

10. The circuit of claim 9, wherein an input of the compare-to-zero unit is connected to an output of the floating point adder and an output of the compare-to-zero unit provides an input to the sphere control unit.

11. The circuit of claim 10, further comprising S and T output multiplexers wherein the control unit controls the select inputs to the output multiplexers and wherein each multiplexer is configured to receive a floating point 0.5 constant as an input, wherein the control unit selects the 0.5 constant inputs if the if value is equal to zero.

12. The circuit of claim 7, wherein an input of the inverse square root unit is connected to an output of the floating point adder and an output of the inverse square root unit provides an input to the control unit.

13. A data processing system including processor and memory, comprising:
a host bridge connected between the processor and an IO bus; and
a graphics adapter connected to the IO bus, wherein the graphics adapter includes a geometry pipeline including a texture coordinate stage and further wherein the texture coordinate stage includes a sphere mode texture coordinate generation circuit comprising a set of input multiplexers configured to receive x, y, and z components ($x_n$, $y_n$, and $z_n$) of a normal vector (n) and x, y, and z components ($x_e$, $y_e$, and $z_e$) of a unit vector (u), wherein the normal vector and unit vector correspond to a current vertex, a set of functional units configured to receive outputs from the set of multiplexers and enabled to perform floating point operations on the received outputs, and a controller enabled to control select inputs to each of the set of input multiplexers to calculate S and T components of sphere mode texture coordinates from the normal vector and the unit vector, wherein the S component is equal to $0.5+0.5(x_e-2x_n n*u)/(rr)^{0.5}$, the T component is equal to $0.5+0.5(x_e-2x_n n*u)/(rr)^{0.5}$, rr is equal to $r_x^2+r_y^2+(r_z+1)^2$, $r_x$ is equal to $x_e-2x_n(n*u)$, $r_y$ is equal to $y_e-2y_n(n*u)$, and $r_z+1$ is equal to $1+z_e-2x_n(n*u)$.

14. The circuit of claim 13, wherein the texture coordinate stage further includes a texture coordinate generation control unit configured to select the sphere mode texture coordinate generation circuit to calculate the S and T components when a texture coordinate mode of the system is sphere mode.

15. The circuit of claim 13, wherein the set of functional units comprises a floating point adder, a floating point multiplier, an inverse square root unit, and a floating point compare-to-zero unit.

16. The circuit of claim 15, further comprising a first output multiplexer and a second output multiplexer, wherein the output of the first output multiplexer represents the S sphere mode texture coordinate and the output of the second output multiplexer represents the T sphere mode texture coordinate.

17. The circuit of claim 16, wherein the first and second output multiplexers each include an input that receives a floating point constant value of 0.5.

18. The circuit of claim 17, wherein the 0.5 outputs of the first and second output multiplexers are selected based on the output of the floating point compare-to-zero unit.

19. The circuit of claim 13, wherein the set of functional units consists of a floating point multiplier, a floating point adder, an inverse square root unit, and a floating point compare-to-zero unit.

* * * * *

UNITED STATES PATENT AND TRADEMARK OFFICE
CERTIFICATE OF CORRECTION

PATENT NO. : 6,822,656 B1
DATED : November 23, 2004
INVENTOR(S) : Joe Christopher St. Clair and Mark Ernest Van Nostrand It is certified that error appears in the above-identified patent and that said Letters Patent is hereby corrected as shown below:

Column 8,
Line 53, claim 1 should read:
1. A circuit for use in a graphics adapter, comprising:

a set of input multiplexers configured to receive x, y, and z components ($x_n$, $y_n$, and $z_n$) of a normal vector (n) and x, y, and z components ($x_e$, $y_e$, and $z_e$) of a unit vector (u), wherein the normal vector and unit vector correspond to a current vertex;

a set of functional units configured to receive outputs from the set of multiplexers and enabled to perform floating point operations on the received outputs; and a controller enabled to control select inputs to each of the set of input multiplexers to calculate S and T components of sphere mode texture coordinates from the normal vector and the unit vector, wherein the S component is equal to $0.5+0.5(x_e-2x_n n\bullet u)/(rr)^{0.5}$, the T component is equal to $0.5+0.5(x_e-2x_n n\bullet u)/(rr)^{0.5}$, rr is equal to $r_x^2+r_y^2+(r_z+1)^2$, $r_x$ is equal to $x_e-2x_n(n\bullet u)$, $r_y$ is equal to $y_e-2y_n(n\bullet u)$, and $r_z+1$ is equal to $1+z_e-2z_n(n\bullet u)$.

Column 9,
Line 51, claim 8 should read:
8. A sphere mode texture coordinate generator circuit, comprising:

a set of input multiplexers configured to receive $x_n$, $y_n$, and $z_n$ components of a normal vector (n) and $x_e$, $y_e$, and $z_e$ components of a unit vector (u), wherein the normal vector and unit vector correspond to a current vertex;

a floating point multiplier configured to receive outputs from a first of the input multiplexers and second of the input multiplexers;

a floating point adder configured to receive outputs from a third of the input multiplexers and a fourth of the input multiplexers;

an inverse square root unit enabled to generate the inverse square root of a floating point input;

UNITED STATES PATENT AND TRADEMARK OFFICE
CERTIFICATE OF CORRECTION

PATENT NO.     : 6,822,656 B1
DATED          : November 23, 2004
INVENTOR(S)    : Joe Christopher St. Clair and Mark Ernest Van Nostrand It is certified that error appears in the above-identified patent and that said Letters Patent is hereby corrected as shown below:

Column 9 (cont'd),
        a set of latches, each enabled to store outputs from a corresponding input multiplexer in the set of input multiplexers; and a control unit configured to control the select inputs for the set of multiplexers such that the sphere mode texture coordinate generator circuit performs a sequence of calculations to determine S and T components of sphere mode texture coordinates wherein the S component is equal to the T component is equal to $0.5+0.5(x_e-2x_n n\bullet u)/(rr)^{0.5}$, rr is equal to $r_x^2+r_y^2+(r_z+1)^2$, $r_x$ is equal to $x_e-2x_n(n\bullet u)$, $r_y$ is equal to $y_e-2y_n(n\bullet u)$, and $r_z+1$ is equal to $1+z_e-2z_n(n\bullet u)$.

Line 62, claim 9 should read:
9. The circuit of claim 8, wherein the sequence of calculations includes calculating a dot product $(n\bullet u)$ of the normal vector and unit vector, calculating $r_x$, $r_y$ and $r_z+1$ values from the dot product and the components of the normal and unit vectors, calculating an rr value from the $r_x$, $r_y$, and $r_z+1$ values, calculating an inverse square root of the rr value, calculating an S component of the sphere mode texture coordinates from the inverse square root value and the $r_x$ value, and calculating a T component of the sphere mode texture coordinates from the inverse square root value and the $r_y$ value.

Column 10,
Line 5, claim 11 should read:
11. The circuit of claim 11, further comprising S and T output multiplexers wherein the control unit controls the select inputs to the output multiplexers and wherein each multiplexer is configured to receive a floating point 0.5 constant as an input, wherein the control unit selects the 0.5 constant inputs if the rr value is equal to zero.

UNITED STATES PATENT AND TRADEMARK OFFICE
CERTIFICATE OF CORRECTION

PATENT NO. : 6,822,656 B1
DATED : November 23, 2004
INVENTOR(S) : Joe Christopher St. Clair and Mark Ernest Van Nostrand It is certified that error appears in the above-identified patent and that said Letters Patent is hereby corrected as shown below:

Column 10 (cont'd),
14. A data processing system including processor and memory, comprising:

a host bridge connected between the processor and an IO bus; and a graphics adapter connected to the IO bus, wherein the graphics adapter includes a geometry pipeline including a texture coordinate stage and further wherein the texture coordinate stage includes a sphere mode texture coordinate generation circuit comprising a set of input multiplexers configured to receive x, y, and z components ($x_n$, $y_n$, and $z_n$) of a normal vector (n) and x, y, and z components ($x_e$, $y_e$, and $z_e$) of a unit vector (u), wherein the normal vector and unit vector correspond to a current vertex, a set of functional units configured to receive outputs from the set of multiplexers and enabled to perform floating point operations on the received outputs, and a controller enabled to control select inputs to each of the set of input multiplexers to calculate S and T components of sphere mode texture coordinates from the normal vector and the unit vector, wherein the S component is equal to $0.5+0.5(x_e-2x_n n\bullet u)/(rr)^{0.5}$, the T component is equal to $0.5+0.5(x_e-2x_n n\bullet u)/(rr)^{0.5}$, rr is equal to $r_x^2+r_y^2+(r_z+1)^2$, $r_x$ is equal to $x_e-2x_n(n\bullet u)$, $r_y$ is equal to $y_e-2y_n(n\bullet u)$, and $r_z+1$ is equal to $1+z_e-2z_n(n\bullet u)$.

Signed and Sealed this

Thirty-first Day of May, 2005

JON W. DUDAS
*Director of the United States Patent and Trademark Office*